(12) United States Patent
Hajimusa et al.

(10) Patent No.: US 10,121,146 B2
(45) Date of Patent: Nov. 6, 2018

(54) SYSTEMS AND METHODS FOR AUTHENTICATION CODE ENTRY IN TOUCH-SENSITIVE SCREEN ENABLED DEVICES

(71) Applicant: VERIFONE, INC., San Jose, CA (US)

(72) Inventors: Imran A. Hajimusa, San Jose, CA (US); Glen Robson, Morgan Hill, CA (US); Davey Faoro, Newcastle, CA (US)

(73) Assignee: VeriFone, Inc., San Jose, CA (US)

( * ) Notice: Subject to any disclaimer, the term of this patent is extended or adjusted under 35 U.S.C. 154(b) by 0 days.

(21) Appl. No.: 15/703,367

(22) Filed: Sep. 13, 2017

(65) Prior Publication Data

US 2018/0005240 A1     Jan. 4, 2018

Related U.S. Application Data

(63) Continuation of application No. PCT/US2016/063285, filed on Nov. 22, 2016.
(Continued)

(51) Int. Cl.
*G06F 3/0488* (2013.01)
*G06Q 20/40* (2012.01)
(Continued)

(52) U.S. Cl.
CPC ......... *G06Q 20/4014* (2013.01); *G06F 3/041* (2013.01); *G06F 3/0488* (2013.01); *G06Q 20/206* (2013.01); *G06F 3/04886* (2013.01)

(58) Field of Classification Search
None
See application file for complete search history.

(56) References Cited

U.S. PATENT DOCUMENTS 6,549,194 B1    4/2003   McIntyre
7,649,478 B1 *  1/2010   Yoon ..................... H03M 11/08
                                                  341/107

(Continued)

FOREIGN PATENT DOCUMENTS

EP    0740244          10/1996
EP    2581818          4/2013
EP    2720133 A2       4/2014

OTHER PUBLICATIONS

Benjamin, Want Seconds on Your Lockscreen Clock? Try 'ClockSeconds', http://www.idownloadblog.com/2011/07/18clockseconds/, Jul. 18, 2011, p. 1.*

(Continued)

*Primary Examiner* — Abdul-Samad A Adediran
*Assistant Examiner* — Kirk Hermann
(74) *Attorney, Agent, or Firm* — Hunton Andrews Kurth LLP

(57) ABSTRACT

Systems and methods for authentication code entry in touch-sensitive screen enabled devices are disclosed. In one embodiment, a method for entering data to a data entry device comprising at least one computer processor and a touch-sensitive screen may include (1) the touch-sensitive screen sensing a first input comprising at least one finger touch; (2) the touch-sensitive screen sensing a release of the first input; (3) the at least one computer processor determining a first number of finger touches in the first input; and (4) the at least one computer processor using the first number of finger touches to identify a first portion of an authentication code.

14 Claims, 14 Drawing Sheets

Figure 5

Related U.S. Application Data

(60) Provisional application No. 62/258,757, filed on Nov. 23, 2015.

(51) Int. Cl.
  *G06Q 20/20* (2012.01)
  *G06F 3/041* (2006.01)

(56) References Cited

U.S. PATENT DOCUMENTS

| | | | |
|---|---|---|---|
| 2004/0066422 A1 | 4/2004 | Chandane | |
| 2004/0151353 A1* | 8/2004 | Topping | F41A 17/066 382/124 |
| 2006/0026521 A1* | 2/2006 | Hotelling | G06F 3/0418 715/702 |
| 2008/0136679 A1* | 6/2008 | Newman | G06F 3/017 341/20 |
| 2009/0102805 A1 | 4/2009 | Meijer et al. | |
| 2009/0295753 A1 | 12/2009 | King | |
| 2010/0001877 A1 | 1/2010 | Nearhoof | |
| 2010/0031344 A1* | 2/2010 | Zhao | G06F 3/04883 726/18 |
| 2010/0134433 A1 | 6/2010 | Miyankishi | |
| 2010/0197352 A1* | 8/2010 | Runstedler | G06F 3/0233 455/566 |
| 2010/0295793 A1 | 11/2010 | Srinivasan et al. | |
| 2011/0307833 A1 | 12/2011 | Dale et al. | |
| 2012/0166995 A1 | 6/2012 | McAleer | |
| 2012/0315606 A1 | 12/2012 | Jwa | |
| 2013/0106700 A1 | 5/2013 | Sugiura et al. | |
| 2013/0234949 A1 | 9/2013 | Chornenky | |
| 2013/0314354 A1* | 11/2013 | Heubel | G06F 3/016 345/173 |
| 2014/0002403 A1* | 1/2014 | Seacat Deluca | G06F 3/0488 345/173 |
| 2014/0009414 A1 | 1/2014 | Huang et al. | |
| 2014/0022182 A1 | 1/2014 | Sawhney et al. | |
| 2014/0109217 A1* | 4/2014 | Park | G06F 21/44 726/17 |
| 2014/0160030 A1 | 6/2014 | Wright et al. | |
| 2014/0189604 A1* | 7/2014 | Garrison | G06F 3/0488 715/863 |
| 2014/0223549 A1* | 8/2014 | Quintanilla | G06F 21/31 726/19 |
| 2014/0247237 A1* | 9/2014 | Chan | G06F 3/04883 345/174 |
| 2014/0282228 A1 | 9/2014 | Pelissier | |
| 2014/0310805 A1 | 10/2014 | Kandekar | |
| 2014/0359504 A1 | 12/2014 | Kim | |
| 2015/0007306 A1* | 1/2015 | Yang | G06F 21/31 726/18 |
| 2015/0123928 A1 | 5/2015 | Zhu et al. | |
| 2015/0199016 A1 | 7/2015 | Suzuki | |
| 2015/0199504 A1 | 7/2015 | Feng et al. | |
| 2015/0324113 A1* | 11/2015 | Kapp | G06F 3/04883 715/863 |
| 2016/0259439 A1 | 9/2016 | Buttolo et al. | |

OTHER PUBLICATIONS

Definition of entry, http://www.dictionary.com/browse/entry?s=t, p. 1.*

Definition of accessible, http://www.dictionary.com/browse/accessible?s=t, p. 1.*

International Search Report and Written Opinion by the ISA/US, International Application No. PCT/US16/63285, dated Apr. 7, 2017, pp. 1-18.

European Communication, European Patent Office, European Patent Application No. 17193190.0, dated Apr. 19, 2018, pp. 1-13.

European Patent Office Communication, European Patent Application No. 17193527.3, dated Dec. 8, 2017, pp. 1-8.

European Patent Office Communication, Europe Patent Application No. 17193190.0, dated Dec. 15, 2017, pp. 1-14.

Adam Turner, "VoiceOver and the Onscreen Keyboard on the iPad", Feb. 4, 2011, XP055430622, Retrieved from the Internet: URL:http://www.smh.com.au/digital-life/computers/blog/gadgets-on-the-go/voiceover-and-the-onscreen-keyboard-on-the-ipad-20110126-1a4xt.html [retrieved on Nov. 30, 2017], pp. 1-4.

Anonymous: "Re: how does entering pin numbers work with voiceover—Google Groups", Oct. 9, 2011, XP055430628, Retrieved from the Internet: URL:https://groups.google.com/forum/print/msg/viphone/7Za8ZfDY3W0/c2Vggei4grcJ?ctz=4162304_52_52_123900_48_436380 [retrieved on Nov. 30, 2017], pp. 1-2.

* cited by examiner

| Digit | Keys | | | |
|---|---|---|---|---|
| | 2 | 1 | 4 | 5 |
| 0 | | ○ | ○ | ○ |
| 1 | ○ | | | |
| 2 | ○ | ○ | | |
| 3 | ○ | | ○ | |
| 4 | ○ | | ○ | ○ |
| 5 | ○ | | | ○ |
| 6 | ○ | ○ | ○ | |
| 7 | ○ | ○ | ○ | ○ |
| 8 | ○ | ○ | | ○ |
| 9 | | ○ | ○ | |
| Backspace | | ○ | | |
| Cancel | | | ○ | |
| Enter | | | | ○ |

SYSTEMS AND METHODS FOR AUTHENTICATION CODE ENTRY IN TOUCH-SENSITIVE SCREEN ENABLED DEVICES

RELATED APPLICATIONS

This application is a Continuation of International Application No. PCT/US16/63285, filed Nov. 22, 2016, which claims the benefit of U.S. Provisional Patent Application Ser. No. 62/258,757 filed Nov. 23, 2015. The disclosures of each of these documents is hereby incorporated by reference in its entirety.

BACKGROUND OF THE INVENTION

1. Field of the Invention

The present disclosure relates generally to input devices, and more particularly to systems and methods for authentication code entry in touch-sensitive screen enabled devices.

2. Description of the Related Art

Payment Acceptance Devices often use physical number pads to receive customer authentication information, such as Personal Identification Number (PIN) codes. With the advent of touch-sensitive screen technology, virtual keypads are sometimes used for PIN code entry. Unlike a traditional keypad, however, touch-sensitive screens have no tactile clues as to where to push for the PIN numbers, therefore increasing the possibility of making an error when entering one's PIN. Further, for a visually impaired individual, the lack of tactile clues may require the visually impaired person to rely on the sales clerk or a third party to input the PIN. This, of course, is likely to compromise the security of a payment instrument, such as a credit or debit card.

SUMMARY OF THE INVENTION

Systems and methods for authentication code entry in touch-sensitive screen enabled devices are disclosed. In one embodiment, a method for entering data to a data entry device comprising at least one computer processor and a touch-sensitive screen may include (1) the touch-sensitive screen sensing a first input comprising at least one finger touch; (2) the touch-sensitive screen sensing a release of the first input; (3) the at least one computer processor determining a number of finger touches in the first input; and (4) the at least one computer processor using the number of finger touches in the first input to identify at least a first portion of an authentication code.

In one embodiment, the number of finger touches in the first input may represent a digit in the authentication code.

In one embodiment, the method may further include the touch-sensitive screen sensing, within a first predetermined period of time from the release of the first input, a second input comprising at least one finger touch; the touch-sensitive screen sensing a release of the second input; the at least one computer processor determining a number of finger touches in the second input; and the at least one computer processor using the number of finger touches in the second input to identify at least a second portion of the authentication code. The at least one computer processor may sum the number of finger touches in the first input and the number of finger touches in the second input, wherein the sum may represent a digit in the authentication code.

In one embodiment, the method may further include the at least one computer processor indicating a passage of the first predetermined period of time.

In one embodiment, the method may further include the touch-sensitive screen receiving, within a second predetermined period of time, a third input comprising at least one finger touch; the touch-sensitive screen sensing a release of the third input; the at least one computer processor determining a number of finger touches in the third input; and the at least one computer processor using the number of finger touches in the third input to identify at least a third portion of the authentication code. The at least one computer processor may sum the number of finger touches in the first input, the number of finger touches in the second input, and the number of finger touches in the third input, wherein the sum may represent a digit in the authentication code.

The method may further include rejecting the first input, the second input, or the third input in response to the first input, the second input, or the third input, or the sum of the first input and the second input, or the sum of the first input, the second input, or the third input is invalid.

According to another embodiment, a data entry device may include a touch-sensitive screen; a memory; and at least one computer processor. The touch-sensitive screen may sense a first input comprising at least one finger touch and may sense a release of the first input. The at least one computer processor determines a number of finger touches in the first input, and may use the number of finger touches in the first input to identify at least a first portion of an authentication code.

In one embodiment, the number of finger touches in the first input may represent a digit in the authentication code.

In one embodiment, the touch-sensitive screen may receive, within a first predetermined period of time, a second input comprising at least one finger touch, and may sense a release of the second input. The at least one computer processor may determine a number of finger touches in the second input; and may use the number of finger touches in the first input and the number of finger touches in the second input to identify at least a second portion of the authentication code. The at least one computer processor may sum the number of finger touches in the first input and the number of finger touches in the second input, wherein the sum may represent a digit in the authentication code.

In one embodiment, the touch-sensitive screen may receive, within a second predetermined period of time, a third input comprising at least one finger touch, and may sense a release of the third input. The at least one computer processor may determine a number of finger touches in the third input and may use the number of finger touches in the first input, the number of finger touches in the second input, and the number of touches in the third input to identify at least a third portion of the authentication code. In one embodiment, the at least one computer processor may sum the number of finger touches in the first input, the number of finger touches in the second input, and the number of finger touches in the third input, wherein the sum may represent a digit in the authentication code.

In one embodiment, the data entry device may reject the first input, the second input, or the third input in response to the first input, the second input, or the third input, or the sum of the first input and the second input, or the sum of the first input, the second input, or the third input is invalid.

In one embodiment, the touch-sensitive screen may sense multiple touches at a plurality of locations.

According to another embodiment, a method for entering data to a data entry device comprising at least one computer processor, a memory, and a touch-sensitive screen may include (1) the touch-sensitive screen providing an input interface comprising a plurality of virtual keys; (2) the touch-sensitive screen sensing a first touch on the touch-sensitive screen; (3) the touch-sensitive screen sensing a release of the first touch and a location of the first touch at the time of release; (4) the at least one computer processor determining a corresponding virtual key based on the location of the first touch at the time of release; (5) the touch-sensitive screen receiving an entry gesture; and (6) the at least one computer processor identifying the corresponding virtual key as a digit in an authentication code.

In one embodiment, the entry gesture may be received at any position on the touch-sensitive screen.

In one embodiment, the entry gesture may comprise a double tap, a checkmark-shaped touch, etc.

In one embodiment, the method may further include the at least one computer processor providing feedback to the user in response to the touch-sensitive screen being touched in a touch-sensitive area of the touch-sensitive screen. The feedback may be tactile feedback (e.g., haptic feedback), a sound, etc.

In one embodiment, the method may further include the at least one computer processor providing feedback to the user in response to one of the virtual keys being touched.

In one embodiment, the first touch may traverse a plurality of multiple virtual keys; and the at least one computer processor may provide feedback to the user as the first touch traverses from a first virtual key to a second virtual key. The feedback may be tactile feedback (e.g., haptic feedback), a sound, etc.

In one embodiment, the virtual keys may be arranged around a periphery of the touch-sensitive screen.

According to another embodiment, a data entry device may include a touch-sensitive screen; a memory; and at least one computer processor. The touch-sensitive screen may provide an input interface comprising a plurality of virtual keys, may sense a first touch on the touch-sensitive screed, and may sense a release of the first touch and a location of the first touch at the time of release. The at least one computer processor may determine a corresponding virtual key based on the location of the first touch at the time of release. The touch-sensitive screen may receive an entry gesture, and the at least one computer processor may identify the corresponding virtual key as a digit in an authentication code.

In one embodiment, the touch-sensitive screen may sense multiple touches at a plurality of locations. In one embodiment, the multiple touches may be substantially simultaneous.

In one embodiment, the entry gesture may be received at any position on the touch-sensitive screen. The entry gesture may comprise a double tap, a checkmark-shaped touch, etc.

In one embodiment, the touch-sensitive screen may provide tactile feedback in response to the touch-sensitive screen being touched in a touch-sensitive area of the touch-sensitive screen, such as haptic feedback.

In one embodiment, the data entry device may further include an audio output device that provides audible feedback in response to the touch-sensitive screen being touched, and/or in response to one of the virtual keys being touched.

In one embodiment, the virtual keys may be arranged around a periphery of the touch-sensitive screen.

In one embodiment, the data entry device may further include a bezel surrounding the touch-sensitive screen. The bezel may be raised relative to a surface of the touch-sensitive screen. The bezel may also include one or more orientation marks.

According to another embodiment, a method for entering data to a data entry device comprising at least one computer processor, a memory, and a touch-sensitive screen, may include: (1) the touch-sensitive screen receiving a touch-based gesture; (2) the at least one computer processor decoding the touch-based gesture to identify a digit, character, or symbol that corresponds to the gesture; and (3) the at least one computer processor using the digit, character, or symbol as an element in an authentication code.

In one embodiment, the touch-based gesture may be based on a Braille number pattern.

In one embodiment, the touch-based gesture may include a finger drag on the touch-sensitive screen.

In one embodiment, the touch-based gesture may be received at one or more quadrants of the touch-sensitive screen, and the computer processor decodes the touch-based gesture based on the one or more quadrants.

According to another embodiment, a data entry device may include a touch-sensitive screen; a memory; and at least one computer processor. The touch-sensitive screen may provide an input interface and may receive a touch-based gesture. The at least one computer processor may decode the touch-based gesture to identify a digit, character, or symbol that corresponds to the gesture, and may use the digit, character, or symbol as an element in an authentication code.

In one embodiment, the at least one computer processor may access a database that stores an association of a plurality of touch-based gestures and digits, characters, or symbols, or that stores an association of a plurality of finger drag touch-based gestures and digits, characters, or symbols, or that stores an association of touch-based gestures at one or more quadrant of the touch-sensitive screen and digits, etc.

According to another embodiment, a method for entering data to a data entry device comprising at least one computer processor, a memory, and a touch-sensitive screen may include (1) the touch-sensitive screen providing an input interface comprising a plurality of virtual keys; (2) the touch-sensitive screen sensing a touch of at least one of the virtual keys within a predetermined time period; (3) the touch-sensitive screen sensing a release of the touch; (4) the at least one computer processor decoding the touch to identify a digit, character, or symbol that corresponds to one or more virtual keys that were touched; and (5) the at least one computer processor using the digit, character, or symbol as an element in an authentication code.

In one embodiment, four virtual keys may be provided. The location of each of the plurality of virtual keys on the touch-sensitive screen may be based on a point at which the touch-sensitive screen is touched.

In another embodiment, the location of each of the plurality of virtual keys on the touch-sensitive screen may be static or fixed.

According to another embodiment, a data entry device may include a touch-sensitive screen; a memory; and at least one computer processor. The touch-sensitive screen may provide an input interface comprising a plurality of virtual keys, may senses a touch of at least one of the virtual keys within a predetermined time period, and may sense a release of the touch. The at least one computer processor may decode the touch to identify a digit, character, or symbol that corresponds to one or more virtual keys that were touched, and may use the digit, character, or symbol as an element in an authentication code.

In one embodiment, four virtual keys may be provided. The location of each of the plurality of virtual keys on the touch-sensitive screen may be based on a point at which the touch-sensitive screen is touched.

In another embodiment, the location of each of the plurality of virtual keys on the touch-sensitive screen may be static or fixed.

In one embodiment, at least one of the at least one computer processor may be a touch-sensitive screen controller.

Any of the data entry devices described herein may be a point of sale device.

Embodiments disclosed herein relate to a data entry device that may include a touch-sensitive screen operative to provide an output indicating at least one finger engagement therewith, which at least one finger engagement represents a PIN, electronic circuitry operative to receive the output and to provide a multi-digit numerical output in which each digit of the multi-digit numerical output represents a digit of the PIN. For example, the electronic circuitry may be operative to recognize finger engagement patterns having a resemblance to Braille number configurations and to associate the finger engagement patterns with digits corresponding to the Braille number configurations to allow a visually impaired person to interact with the touchscreen data entry device.

Some embodiments of a data entry device may include a non-visual stimulus generator operative to assist a user in at least one of locating a suitable location for and initiating the at least one finger engagement therewith. Additionally or alternatively, each digit of the multi-digit numerical output represents a separate two-dimensional cursive finger engagement. Alternatively or additionally, each digit of the multi-digit numerical output may represent a portion of at least one two-dimensional cursive finger engagements.

In one embodiment, the non-visual stimulus generator may include a tactile stimulus generator. Additionally or alternatively, the non-visual stimulus generator may also include an audio stimulus generator.

In one embodiment, the non-visual stimulus generator may include a variable frequency stimulus generator wherein a change in frequency indicates the proximity of the user's finger to the suitable location on the touch-sensitive screen. Additionally or alternatively, the non-visual stimulus generator may generate user-sensible feedback in response to the at least one finger engagement.

In one embodiment, the data entry device may also include at least one non-PIN entry finger engagement responsive function generator. The at least one non-PIN entry finger engagement responsive function generator may include a re-entry prompt generator.

In one embodiment, the non-visual stimulus generator may include at least one user sensible physical bump having a predetermined location with respect to the touch-sensitive screen. Additionally or alternatively, the non-visual stimulus generator may include at least one vibration generator providing at least one vibration at at least one predetermined location with respect to the touch-sensitive screen.

In one embodiment, a data entry device may include a touch-sensitive screen operative to provide an output indicating a number of simultaneous finger engagements therewith, which simultaneous finger engagements may at least partially overlap in time and electronic circuitry operative to receive the output indicating a number of simultaneous finger engagements therewith for a plurality of sequential occurrences of simultaneous finger engagements and to provide a multi-digit numerical output in which each digit of the multi-digit numerical output represents the number of simultaneous finger engagements in at least one of the plurality of sequential occurrences of simultaneous finger engagements. For example, a digit "9" may be represented by simultaneous finger engagements of nine fingers during a single occurrence. Alternatively, a digit "9" may be represented by two sequential occurrences of first five simultaneous finger engagements and then four simultaneous finger engagements which occur within a predetermined time period of each other In one embodiment, each digit of the multi-digit numerical output may represent the number of simultaneous finger engagements in one or more sequential occurrences of simultaneous finger engagements which occur within a predetermined time period of each other. In accordance one embodiment, the electronic circuitry may sum the numbers of simultaneous finger engagements in the one or more sequential occurrences together, and the digit represents a sum of adding the numbers of simultaneous finger engagements.

In one embodiment, the digit "0" may be represented by simultaneous finger engagements in at least two sequential occurrences of simultaneous finger engagements which occur within a predetermined time period of each other. For example, a digit "0" may be represented by simultaneous finger engagements in two sequential occurrences each of five simultaneous finger engagements which occur within the predetermined time period of each other.

In one embodiment, digits may be represented by simultaneous finger engagements in one or more sequential occurrences of simultaneous finger engagements which occur within a predetermined time period of each other.

In one embodiment, the data entry device may include an input feedback transducer that may provide a user-sensible feedback upon expiry of the predetermined time period following the at least one sequential occurrence. In one embodiment, the multi-digit numerical output may be a personal identification number.

In one embodiment, the data entry device may include an encryptor that may encrypt the multi-digit numerical output. The data entry device may also include an input feedback transducer that may provide a user-sensible feedback responsive to successful entry of each the digit.

In one embodiment, a data entry device may include a touch-sensitive screen operative to provide an output indicating at least one finger engagement therewith, which at least one finger engagement represents a PIN, a non-visual stimulus generator operative to assist a visually impaired user in at least one of locating a suitable location for and initiating the at least one finger engagement therewith and electronic circuitry operative to receive the output and to provide a multi-digit numerical output in which each digit of the multi-digit numerical output represents the PIN.

In one embodiment, each digit of the multi-digit numerical output may represent a separate two-dimensional cursive finger engagement. Each digit of the multi-digit numerical output may represent a portion of at least one two-dimensional cursive finger engagements.

In one embodiment, a user may enter a scribble of a code, such as a PIN code, without a pin-pad device, or enter a gesture that is uniquely recognized by the payment acceptance device. The data entry device may process the entry using an algorithm that associates the scribble or gesture with a unique non-payment identifier and a protocol to transmit the unique nonpayment identifier to the authentication server to authenticate the user.

In one embodiment, the non-visual stimulus generator may include a tactile stimulus generator, which may include an audio stimulus generator.

In one embodiment, the non-visual stimulus generator may include a variable frequency stimulus generator wherein a change in frequency indicates a difference of position of a user's finger relative to a suitable location on the touch-sensitive screen. The non-visual stimulus generator may generate user-sensible feedback in response to the at least one finger engagement.

In one embodiment, the data entry device may include at least one non-PIN entry finger engagement responsive function generator, which may be a re-entry prompt generator.

In one embodiment, the non-visual stimulus generator may include at least one user sensible physical bump that may have a predetermined location with respect to the touch-sensitive screen.

In one embodiment, the non-visual stimulus generator may include at least one vibration generator providing at least one vibration at at least one predetermined location with respect to the touch-sensitive screen.

BRIEF DESCRIPTION OF THE DRAWINGS

For a more complete understanding of the present invention, the objects and advantages thereof, reference is now made to the following descriptions taken in connection with the accompanying drawings in which:

FIG. 12 depicts an exemplary keying pattern according to one embodiment;

FIGS. 14A and 14B depict exemplary virtual keypads according to embodiments.

DETAILED DESCRIPTION OF PREFERRED EMBODIMENTS

Several embodiments of the present invention and their advantages may be understood by referring to FIGS. 1-14.

Embodiments are directed to touch-sensitive screen authentication code (e.g., a PIN) entry devices and methods. Although embodiments may be disclosed in the context of the entry of a PIN, it should be recognized that the entry of any authentication code, including letters, numbers, gestures, etc. is also contemplated and within the scope of this disclosure, and the use of the term PIN should be recognized to encompass this other data.

Figure 1:
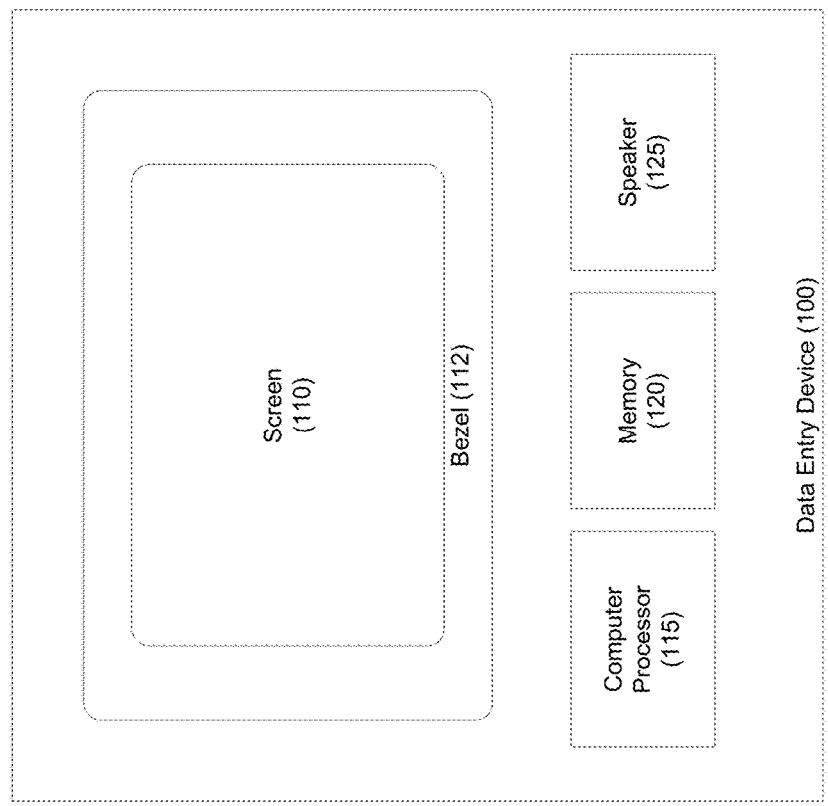
FIG. 1 depicts a touch-sensitive screen PIN entry device according to one embodiment.

Referring to FIG. 1, a touch-sensitive screen data entry device is disclosed according to one embodiment. Data entry device 100 may include screen 110, computer processor 115, memory 120, and speaker 125. Data entry device 100 may interface with at least one network (not shown), such as communication networks, payment networks, etc. Other peripherals (e.g., input devices, displays, headphone jacks, Bluetooth interfaces, etc.) may be provided as necessary and/or desired.

In one embodiment, data entry device 110 may be a point of sale (POS) device.

In one embodiment, computer processor 115 may be any suitable processing machine that executes the instructions that may be stored in internal and/or external memory or memories to process data. It may include general purpose computer processors, specialized computer processors, integrated circuits, programmed microprocessors, micro-controllers, peripheral integrated circuit elements, a CSIC (Customer Specific Integrated Circuit), ASIC (Application Specific Integrated Circuit), other integrated circuits, digital signal processors, programmable logic devices such as a FPGA, PLD, PLA or PAL, or any other suitable device or arrangement of devices.

In one embodiment, screen 110 may be a touch-sensitive screen device, and may be sensitive to a single touch, or to multiple touches. In one embodiment, screen 110 may provide a user with tactile feedback, such as haptic feedback. Feedback may be provided in response to the user touching screen 110, in response to a user touching a virtual key on screen 110, at certain orientation points on screen 110, etc.

In one embodiment, screen 110 may include a microcontroller or other controller that may sense and process touches and release of touches to the surface of screen 110. In one embodiment, as used herein, computer processor 115 may refer to such a microcontroller or processor. Further the functionality of sensing and processing touches and release of touches may be divided between a microcontroller (or other controller) and computer processor 110.

In embodiments, processing on data sensed by screen 110 may performed by computer processor 115 and/or a computer processor, controller, microcontroller, etc. that may control the operation of screen 110.

In one embodiment, the user may be provided with audible feedback (e.g., a low frequency hum) when the user is touching a touch-sensitive portion of screen 110.

In one embodiment, the strength of feedback provided via screen 110 may vary depending on the distance of the touch from the center of screen 110. For example, nearer the location on the touch-sensitive screen is to the center of screen 110, the greater the vibration frequency at the location. The user can thus sense the vibration pattern to position a finger in the center of the screen 110.

Figure 2:
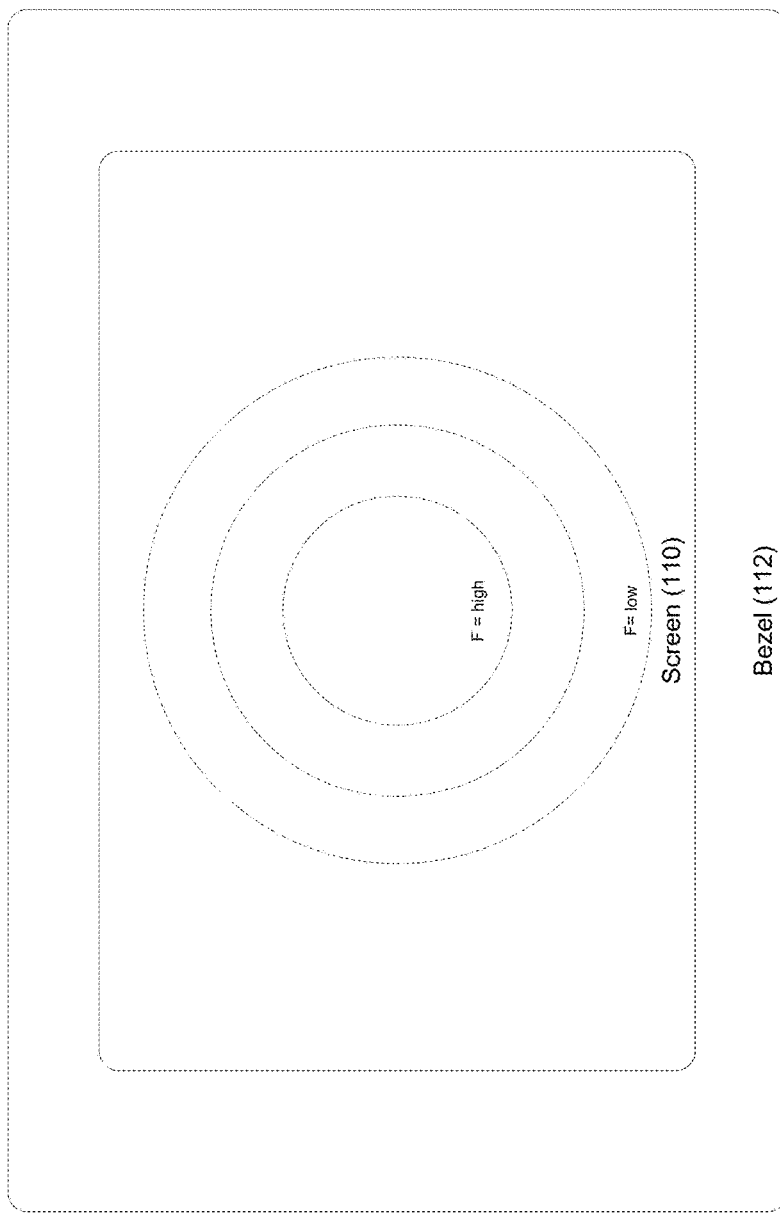
FIG. 2 depicts a touch-sensitive screen including tactile markers according to one embodiment.

An example of such feedback is provided in FIG. 2. In FIG. 2, three levels of feedback are disclosed; a greater or fewer number of feedback levels may be provided as is necessary and/or desired (e.g., F=high to F=low). And, although the feedback levels are depicted as circles, any suitable shape or combinations thereof (e.g., oval, rectangular, based on location of virtual keys, etc.) may be used as is necessary and/or desired.

In one embodiment, the user may be guided by a vibration pattern towards the center of the touch-sensitive screen. For example, the user may initiate the device for operation by positioning, for example, one or more fingers on the screen, which causes the screen to vibrate at all locations. The nearer the location on the touch-sensitive screen is to the center of the touch-sensitive screen, the greater the vibration frequency at the location. The user may sense the vibration pattern to position a finger in the center of the touch-sensitive screen.

In one embodiment, when the device senses that the user is properly oriented, a feedback signal, such as an audio prompt or haptic prompt, may signal the user to begin the authentication process (e.g., to enter the first numeric digit of the PIN code).

Referring again to FIG. 1, in one embodiment, screen 110 may be provided with bezel 112 or other surrounding (not shown) that may help in positioning and/or orienting the user's fingers on screen 110. In one embodiment, bezel 112 may be made of a different material and/or may provide a height difference from screen 110 to assist the user in knowing when the user is no longer touching screen 110.

Figure 3:
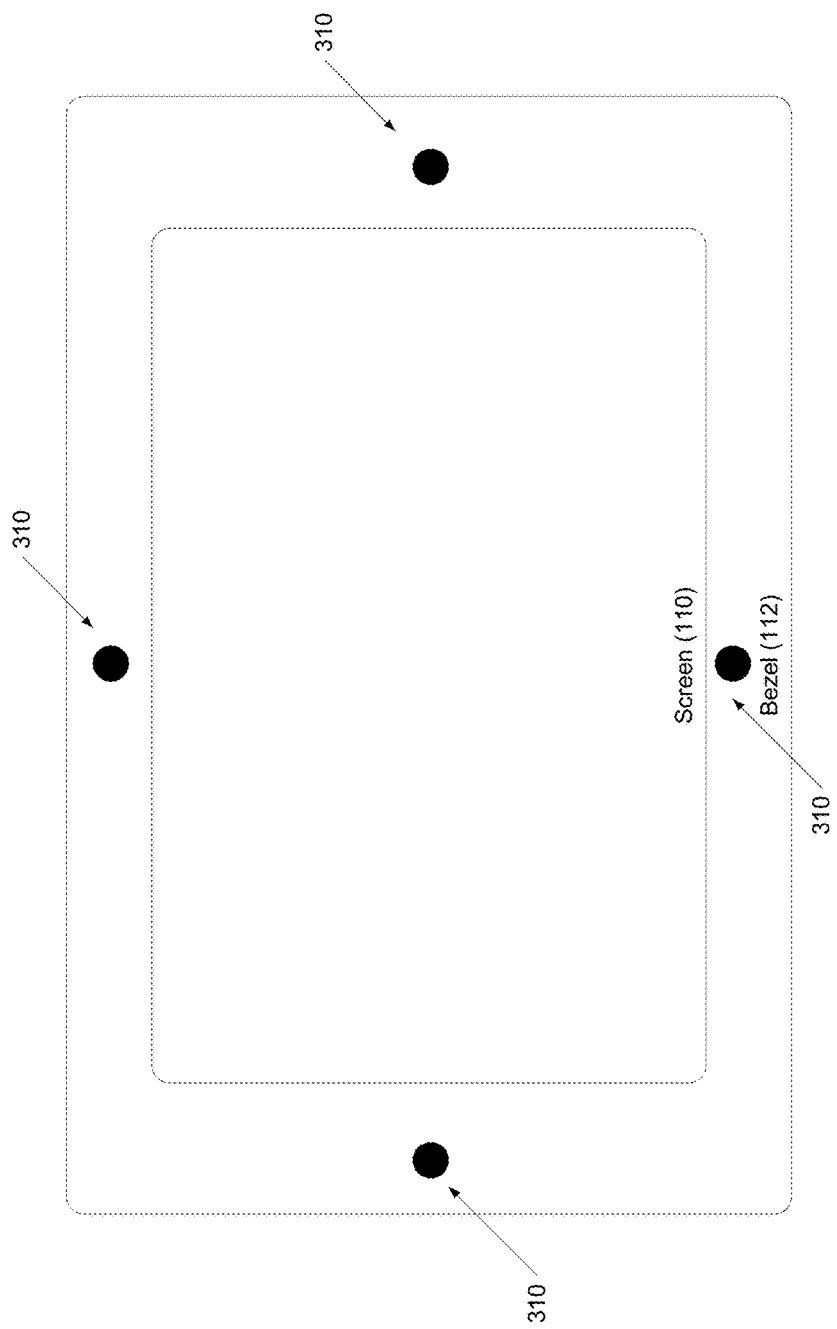
FIG. 3 depicts a touch-sensitive screen bezel or surround including tactile markers according to one embodiment.

Referring to FIG. 3, in one embodiment, bezel 112 may include one or orientation marks 310, such as dots, lines, etc. that may be orientation points for the user. In one embodiment, orientation marks 310 may be raised relative to the top surface of bezel 112; in another embodiment, orientation marks 310 may be depressions in the top surface of bezel 112. In still another embodiment, orientation marks 310 may be made from a different material, may provide a different touch sensation (e.g., spongy, temperature, vibration, etc.), from the top surface of bezel 112, which may otherwise provide a uniform top surface. In still another embodiment, orientation marks 310 may comprise dynamic tactile bumps.

Figure 4:
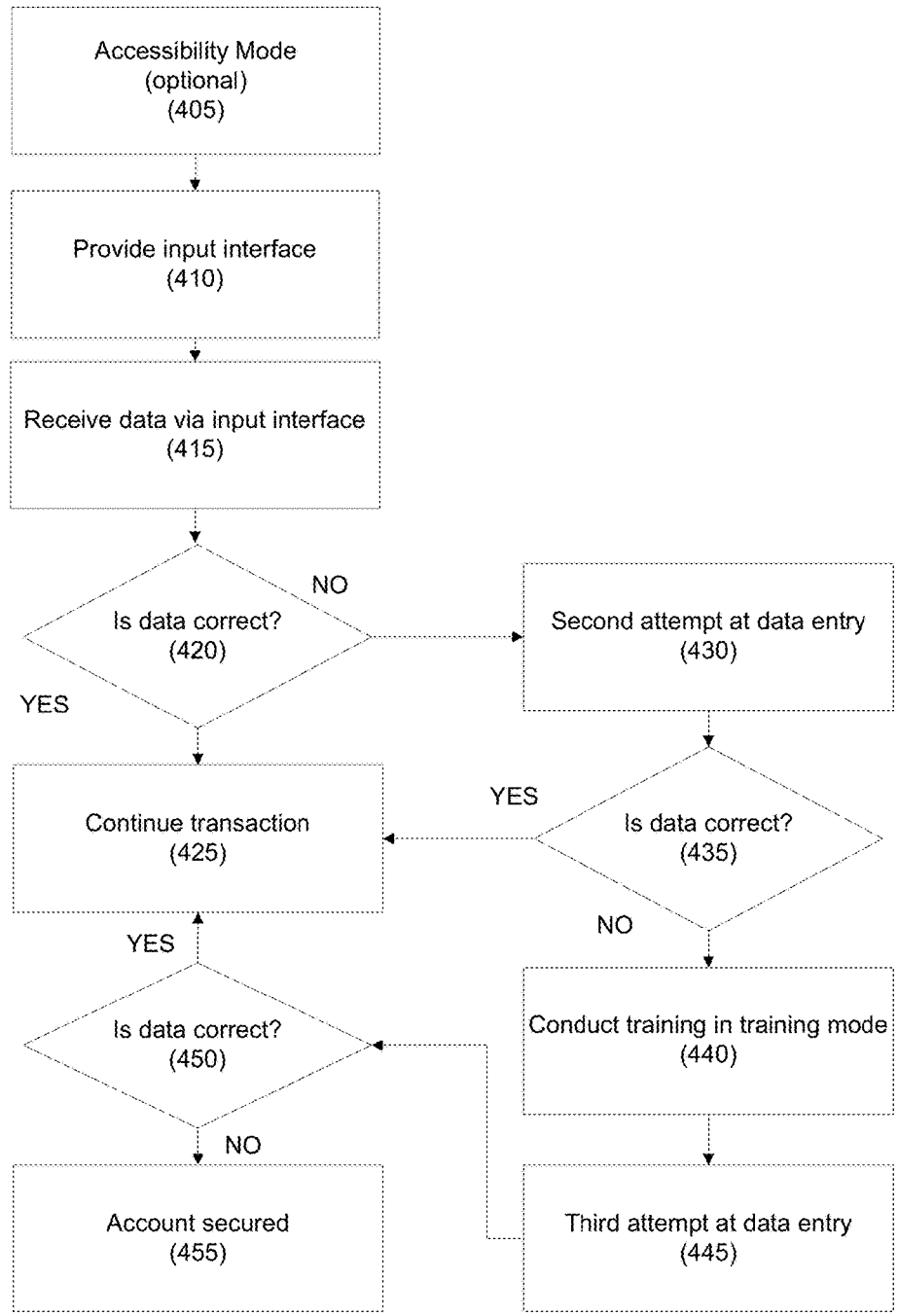
FIG. 4 depicts a method for entering data into a touch-sensitive screen enabled data entry device according to one embodiment.

Referring to FIG. 4, a method for interacting with a touch-sensitive screen data entry device is provided according to one embodiment.

The method may include optional step 405. In step 405, a user may request that the data entry device enter an accessibility mode, whereby data entry may be accomplished using an alternative method than the one that the data entry device usually uses. For example, this may allow for the selection of at least one of the embodiments disclosed here.

In one embodiment, the request may be made in any suitable manner, including by touch (e.g., touch a specific area of the screen, multiple touches (e.g., 3) within a predetermined time period, etc.). In one embodiment, the data entry device may automatically enter accessibility mode based on a received identification and a user preference. For example, if the user's preference is to enter accessibility mode, the data entry device may enter accessibility mode whenever a transaction involving the user is initiated (e.g., in response to receipt of a card swipe, chip card, NFC transmission, user biometric, detection of a device registered to the user, etc.). For simplicity, in this embodiment, when accessibility mode is entered in step 405, a data entry method is automatically selected. However, a person of skill in the art will understand that in alternative embodiments, step 405 may include the selection of a data entry method from amongst two or more data entry methods.

In one embodiment, the data entry device may indicate that it is capable of entering accessibility mode to the user. In one embodiment, the data entry device may make a sound (e.g., a chime) at the beginning of the transaction, when the card is swiped or inserted, etc.

In one embodiment, accessibility mode may be manually selected by the user entered at any time during the transaction.

In one embodiment, during a first use, or as necessary and/or desired, the data entry device may enter a "learning mode" in which the user's handwriting, gestures, and characteristics thereof are learned and stored. In one embodiment, this data may be stored on the chip of a transaction card, or may be stored in, for example, the cloud.

In step 410, data entry device may provide an input interface for the user. In one embodiment, the user may select from a menu the mode of input interface desired (e.g., virtual keypad, Braille entry, gesture entry, script entry, touch PIN entry, etc.). In one embodiment, the mode may be automatically selected based on a user preference. In still another embodiment, the data entry device may determine the mode from user interaction. In still another embodiment, a customer representative may select the mode for the user via, for example, a second screen of the data entry device. In still another embodiment, the data entry device may only support one mode of an input interface.

In step 415, the user may enter an authentication code, such as a PIN, using the input interface. Exemplary embodiments of entering data using various input interfaces are disclosed below.

In step 420, the data entry device, or a remote server, may determine whether the data that is entered is correct. If it is, in step 425, the transaction may continue.

If the first data entry is incorrect, in step 430, the user may be given a second attempt to enter correct data in step 435. If the second data entry is correct, in step 425, the transaction may continue. In one embodiment, the entered authentication code (e.g., a PIN code) may be encrypted before being transmitted to an authentication authority, such as a credit card issuer, financial institution, etc.

In one embodiment, transaction data may also be provided to the authenticating authority, either encrypted or unencrypted.

In one embodiment, the data entry device may verify the authentication code against data stored on the transaction card (e.g., on the chip), in the cloud, etc.

The authentication authority may decrypt the entered data and transaction data and may complete the authentication process.

If the second data entry is incorrect, in step 440, the data entry device may enter a training mode, in which the user may receive audible instruction on how to enter data using the input interface. In one embodiment, the user may manually exit the training mode when desired. A person of skill in the art will understand that while this embodiment describes two incorrect entries triggering a training mode, any number of incorrect attempts may be entered before the training mode is entered.

In one embodiment, training mode may be entered automatically for predetermined number of initial uses of a card. During this period, the system may require additional authentication from the user to authenticate the transaction. The entries provided during the training mode may become a baseline for comparison in the authentication mode, where a user may not need to provide additional authentication information, based on the results of comparing a current signature input with the accumulated stored signature inputs provided during the learning mode.

In one embodiment, learning and/or training may be performed off-line, using a mobile device, etc.

In step 445, the user may be given a third attempt to enter correct data. If, in step 450, the third data entry is correct, in step 425, the transaction may continue.

If the third data entry (or any suitable number of entries) is incorrect, in step 455, an account securing action, such as locking the account, may be performed by, for example, an authentication authority such as the issuer of the financial instrument involved in the transaction. In one embodiment, the data entry device may provide specific details of the transaction, data input attempts, biometrics, video, etc. to the authentication authority as necessary and/or desired.

Figure 5:
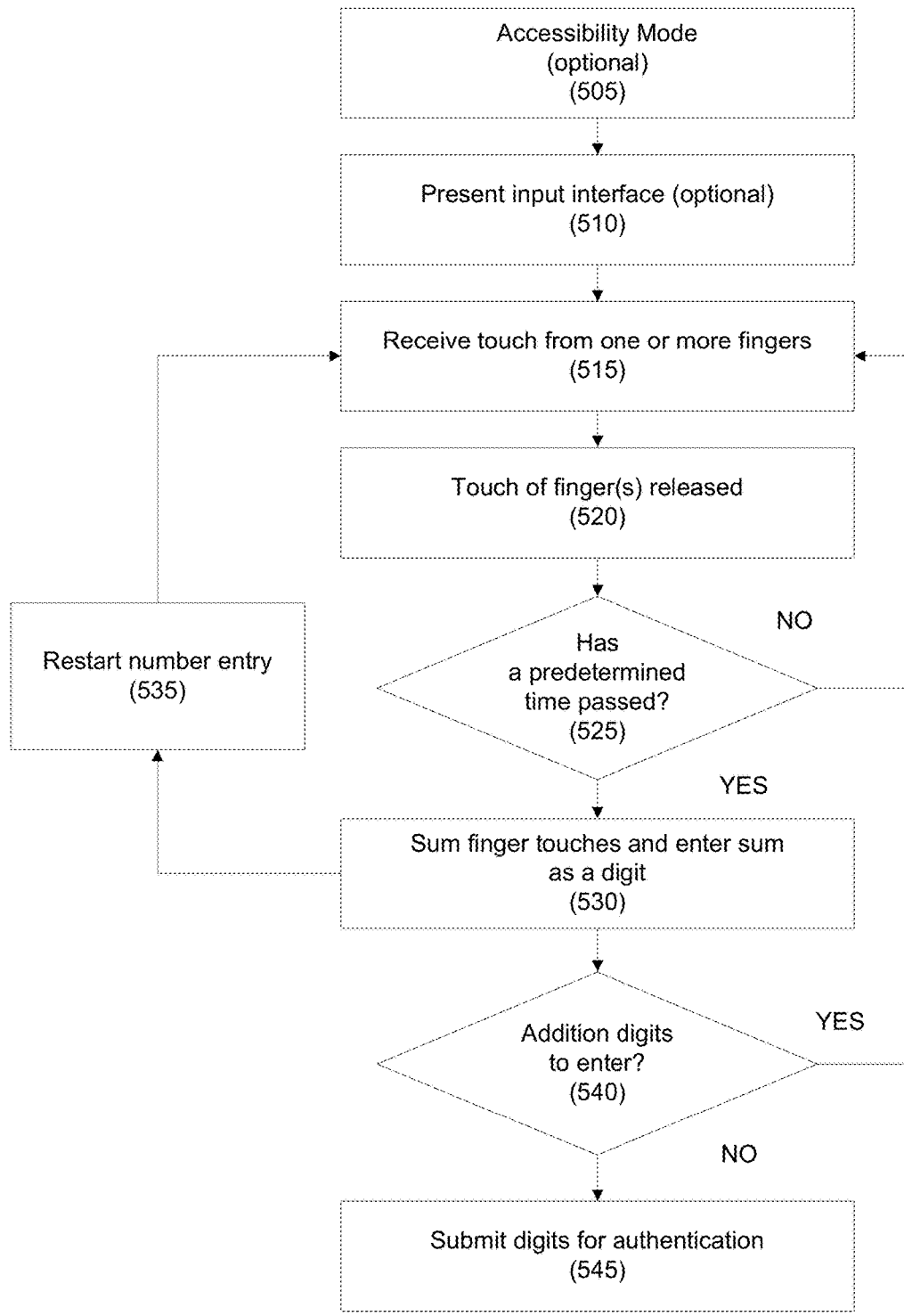
FIG. 5 depicts a method for entering data into a touch-sensitive screen enabled data entry device according to another embodiment.

Referring to FIG. 5, a method of authentication code entry using a touch-sensitive screen device is disclosed according to one embodiment.

In one embodiment, in optional step 505, the data entry device may enter the accessibility mode. This may be similar to step 405, discussed above.

In one embodiment, in optional step 510, an entry interface may be presented.

In steps 515-525, the user may repeatedly touch the screen and release the touch with one or more fingers within a predefined manner. In one example, the total number of finger touches may equal a digit of an authentication code entry, such as a PIN. For example, if the user wishes to enter the number "6," the user may touch the screen with three fingers, then release or break the contact with the screen, and within a predetermined time period, may touch the screen again with three fingers. In entering a number, the user may use any combination of finger touches desired (e.g., six touches of a single finger, a first touch with four fingers and a second touch with 2 fingers. etc.). In one embodiment, a zero may be represented by ten finger touches.

In one embodiment, it should be recognized that the touches and/or release do not have to be exactly simultaneous. In one embodiment, time at which the touches occur, and/or the time at which the release occurs, may happen within a predetermined time in order to be considered simultaneous for purposes of this invention.

In one embodiment, the manner in which a user enters a digit may be part of the authentication process. For example, if the user desires to enter the digit "6," the user may register the entry pattern of two finger touches, one finger touch, and three finger touches. Even though other entry patterns may equal the digit "6", such as two consecutive three finger touches, or a single six finger touch, for authentication purposes, this may be rejected.

In one embodiment, the location at which the user touches the screen, the strength (e.g., pressure) of the touch, the timing of the touch, etc. may also be used in the authentication process.

When user has entered the desired sequence of touches, the user may not make contact again with the touch-sensitive screen for a predetermined period of time, in order for the sequence of touches to be recognized as an entry of a digit. In step 530, the data entry device may sum the finger touches and record the corresponding number as a number in the authentication code. In one embodiment, the data entry device may emit a sound or other indicator indicating the successful entry of a digit, and may display an indicator that a number was received (e.g., display an asterisk). Alternatively, instead of the touches representing specific digits of the authentication code, the sequence of touches may represent the data entry that may be used to authenticate the user.

If there is an error (e.g., the sum is greater than 10 or the sequence of touches is incorrect), no digits were entered, etc., in step 535, an error message, for example a sound or dialog, may be played, and the data entry for that number may be rejected and may be restarted. Thus, the data entry may be rejected independent of the authentication submission.

If, in step 540, there are any additional digits or touches to enter, the process is repeated until all digits or touches are entered. If all digits are received, in step 545, the authentication code may be submitted to an authentication authority (e.g., an issuer) for approval. In one embodiment, the authentication code may be encrypted before being transmitted.

In one embodiment, the data entry device may verify the authentication code against data stored on the transaction card (e.g., on the chip), in the cloud, etc.

In one embodiment, a sequence of touches may comprise an authentication code. For example, a first number of touches may represent a first entry, a second number of touches may represent a second entry, a third number of touches may represent a third entry, a fourth number of touches may represent a fourth entry, etc. Each entry may be independent of a number or digit; instead, the pattern as well as other data (e.g., location of touches, timing of touches, strength (e.g., pressure) of touches, etc.) may be used to authenticate the user.

In one embodiment, transaction data may also be provided to the authenticating authority, either encrypted or unencrypted.

As discussed above, if the authentication code is incorrect, the process may be repeated, and if unsuccessful, the user may receive training.

Figure 6:
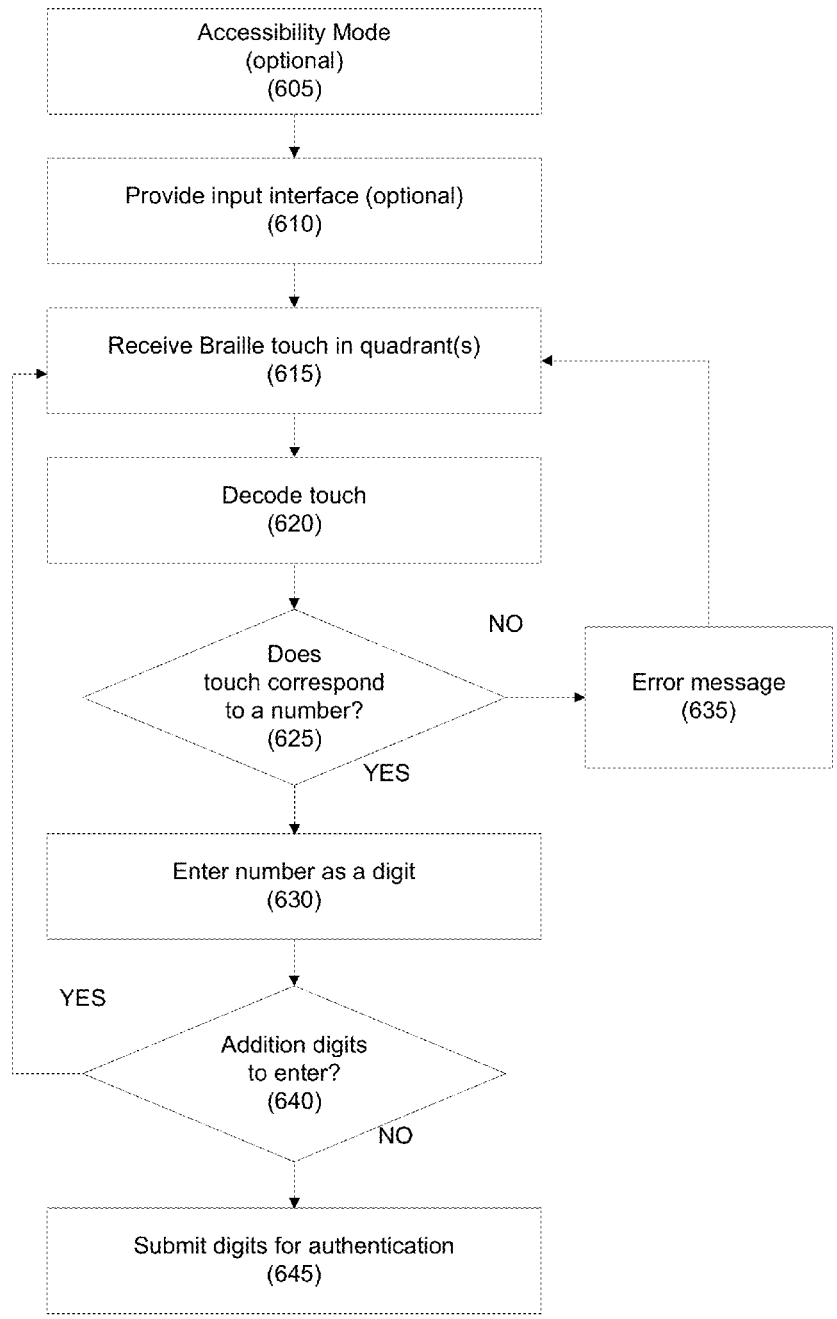
FIG. 6 depicts a method for entering data into a touch-sensitive screen enabled data entry device according to another embodiment.
Figure 7:
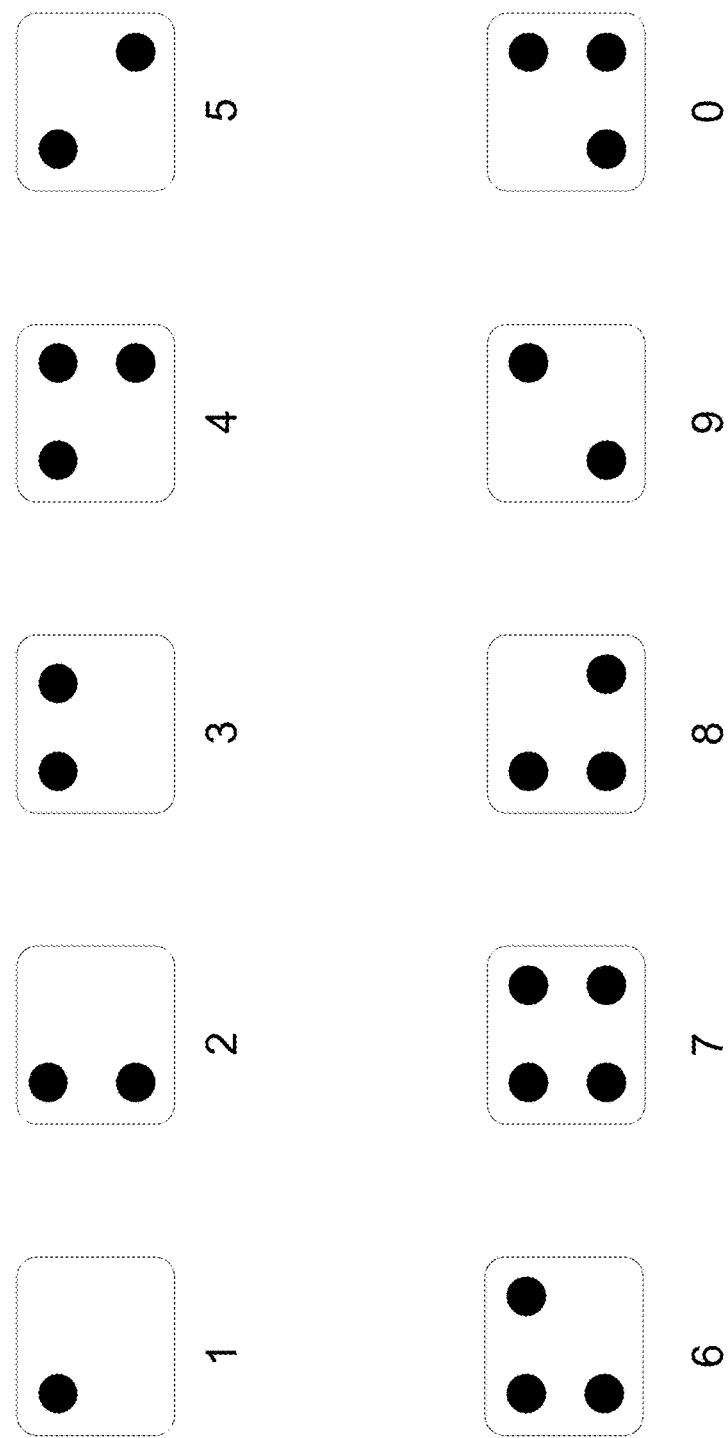
FIG. 7 depicts exemplary symbols for entry as touches according to one embodiment.

Referring to FIG. 6, a method of authentication code entry using a touch-sensitive screen device is disclosed according to one embodiment.

In one embodiment, in optional step 605, the data entry device may enter the accessibility mode. This may be similar to step 405, discussed above.

In one embodiment, in optional step 510, an entry interface may be presented.

In step 615, the data entry device may provide an input interface that may include four quadrants. In one embodiment, the delineations between the quadrants may be displayed on the screen. In another embodiment, tactile feedback may be provided to delineate the quadrants. In still another embodiment, the quadrants may not be defined until data entry is received, thereby allowing the user to define the quadrants.

The user may then touch one or more of the quadrants substantially simultaneously. In one embodiment, the user may touch the screen using the International Standardized Braille number pattern, provided in FIG. 7. Other patterns, including user-defined patterns, may be used as is necessary and/or desired.

Referring again to FIG. 6, in step 620, the received touch may be decoded based on the pattern.

In step 625, if the touch corresponds to a registered pattern number, in step 630, the corresponding number may be recorded. In one embodiment, the data entry device may emit a sound or other indicator indicating the successful entry of a digit, and may display an indicator that a number was received (e.g., display an asterisk).

If the touch does not correspond to a registered pattern number, in step 635, an error message, for example a sound or dialog, may be played, and the process may be repeated.

If, in step 640, if there are additional digits to enter, the process is repeated until all digits are entered. If all digits are received, in step 640, the authentication code may be submitted to an authentication authority (e.g., an issuer) for approval. In one embodiment, the authentication code may be encrypted before being transmitted.

In one embodiment, transaction data may also be provided to the authenticating authority, either encrypted or unencrypted.

In one embodiment, the data entry device may verify the authentication code against data stored on the transaction card (e.g., on the chip), in the cloud, etc.

As discussed above, if the authentication code is incorrect, the process may be repeated, and if unsuccessful, the user may receive training.

Figure 8:
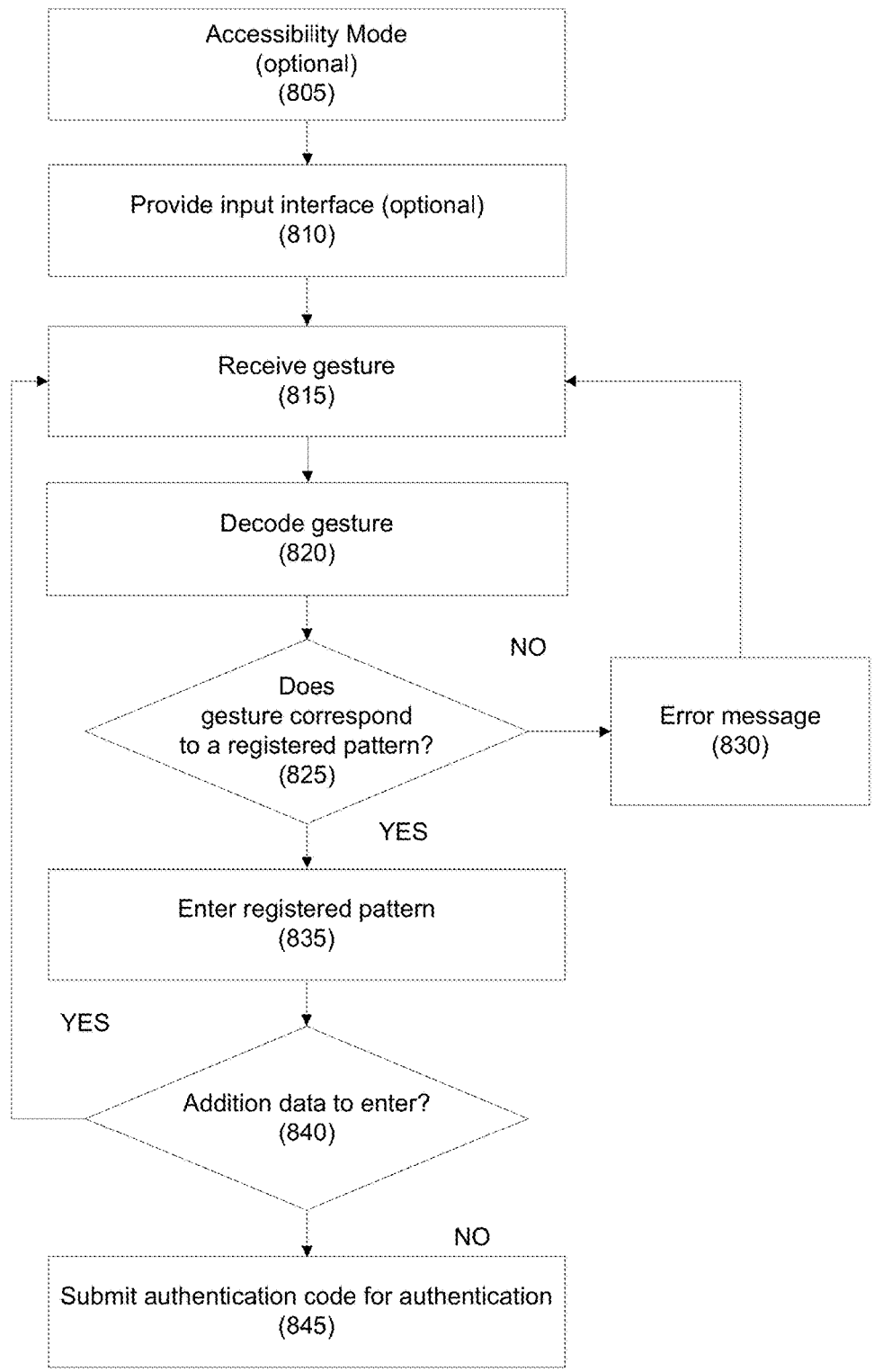
FIG. 8 depicts a method for entering data into a touch-sensitive screen enabled data entry device according to another embodiment.
Figure 9:
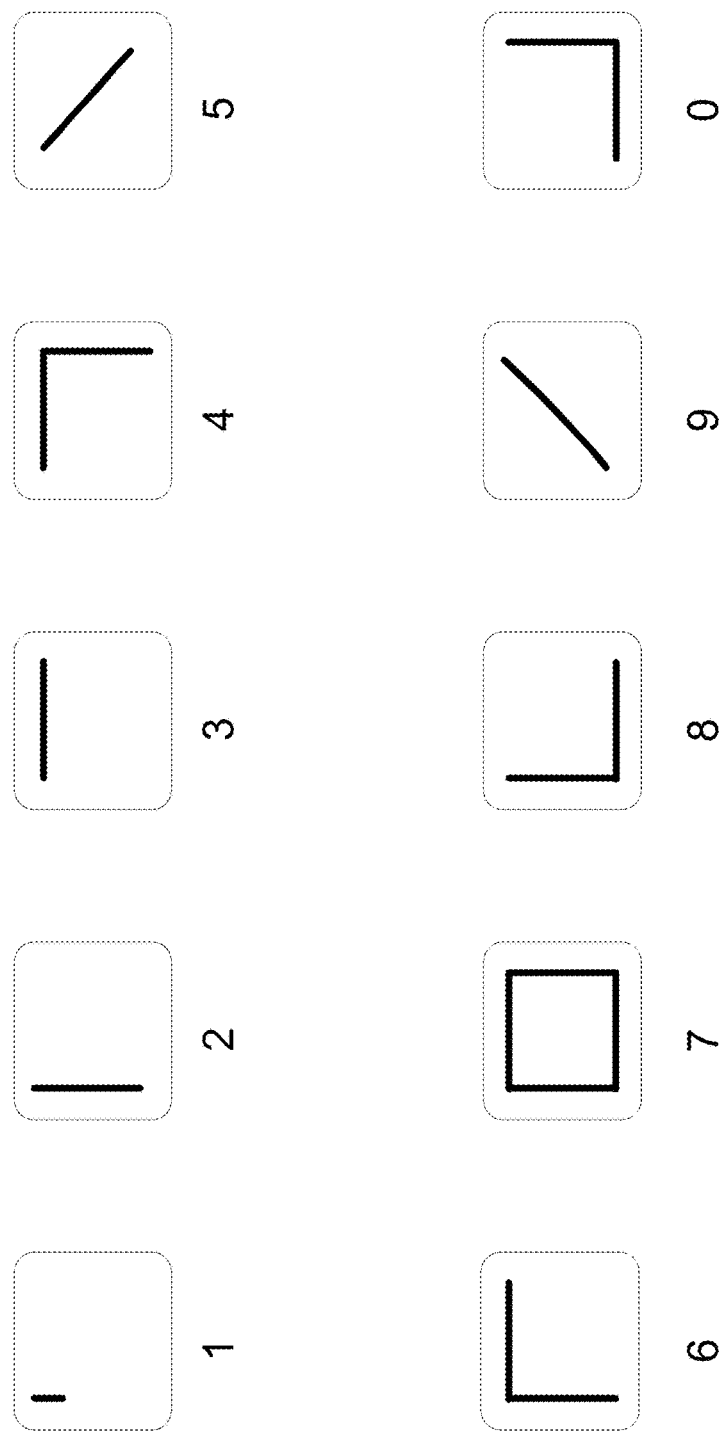
FIG. 9 depicts exemplary touch gestures for entry according to one embodiment.

Referring to FIG. 8, a method of authentication code entry using a touch-sensitive screen device is disclosed according to one embodiment.

In one embodiment, in step 805, the data entry device may enter the accessibility mode. This may be similar to step 405, discussed above.

In one embodiment, in optional step 810, an entry interface may be presented.

In step 815, the user may enter a gesture. In one embodiment, the gesture may be based on the International Standardized Braille pattern. An example of number patterns are provided in FIG. 9.

Other patterns, including user-defined patterns for numbers, letters, shapes, and/or symbols, may be used as is necessary and/or desired.

In one embodiment, the gesture may be a scribble of a digit, character, shape, or symbol. For example, the user may scribble any number on the screen.

In another embodiment, the gesture may comprise one or more touches at one or more locations.

In one embodiment, the gesture may comprise an actual signature of the user, or it may be the digits of an authentication code or other symbols, such as the Braille representation of the digits comprising the user's PIN code.

Referring again to FIG. 8, in step 820, the received gesture may be decoded based on the registered pattern.

In one embodiment, the data entry device may apply an algorithm to decode the gesture. Any suitable algorithm that may decode writing received at a touch-sensitive screen may be used.

In one embodiment, the analysis of the gesture may take into account speed, writing style, location, timing, and/or pressure. In one embodiment, one or more of these characteristics may be compared to data obtained during learning or in prior authentications as another authentication check.

For example, if the stored data indicates that the user normally writes a "1" with a downward stroke, and the "1" was received with an upward stroke, additional authentication may be required.

In step 825, if the gesture corresponds to a registered pattern, in step 830, the corresponding number, character, shape, and/or symbol may be recorded. In one embodiment, the data entry device may emit a sound or other indicator indicating the successful entry of a digit, and may display an indicator that a number was received (e.g., display an asterisk).

If the gesture does not correspond to a registered pattern for a number, character, shape, and/or symbol, in step 835, an error message and/or sound may be played, and the process may be repeated. Thus, the gesture may be rejected independent of the authentication submission.

If, in step 840, if there are additional digits, characters, shapes, and/or symbols to enter, the process is repeated until all digits are entered. If all digits, characters, shapes, and/or symbols are received, in step 840, the authentication code may be submitted to an authentication authority (e.g., an issuer) for approval. In one embodiment, the authentication code may be encrypted before being transmitted.

In one embodiment, transaction data may also be provided to the authenticating authority, either encrypted or unencrypted.

In one embodiment, the data entry device may verify the authentication code against data stored on the transaction card (e.g., on the chip), in the cloud, etc.

In one embodiment, the speed, writing style, and pressure may be saved for reference in future transactions. In one embodiment, it may be stored in the data entry device memory, in the cloud, on a chip on the transaction device, etc.

As discussed above, if the authentication code is incorrect, the process may be repeated, and if unsuccessful, the user may receive training.

Figure 10:
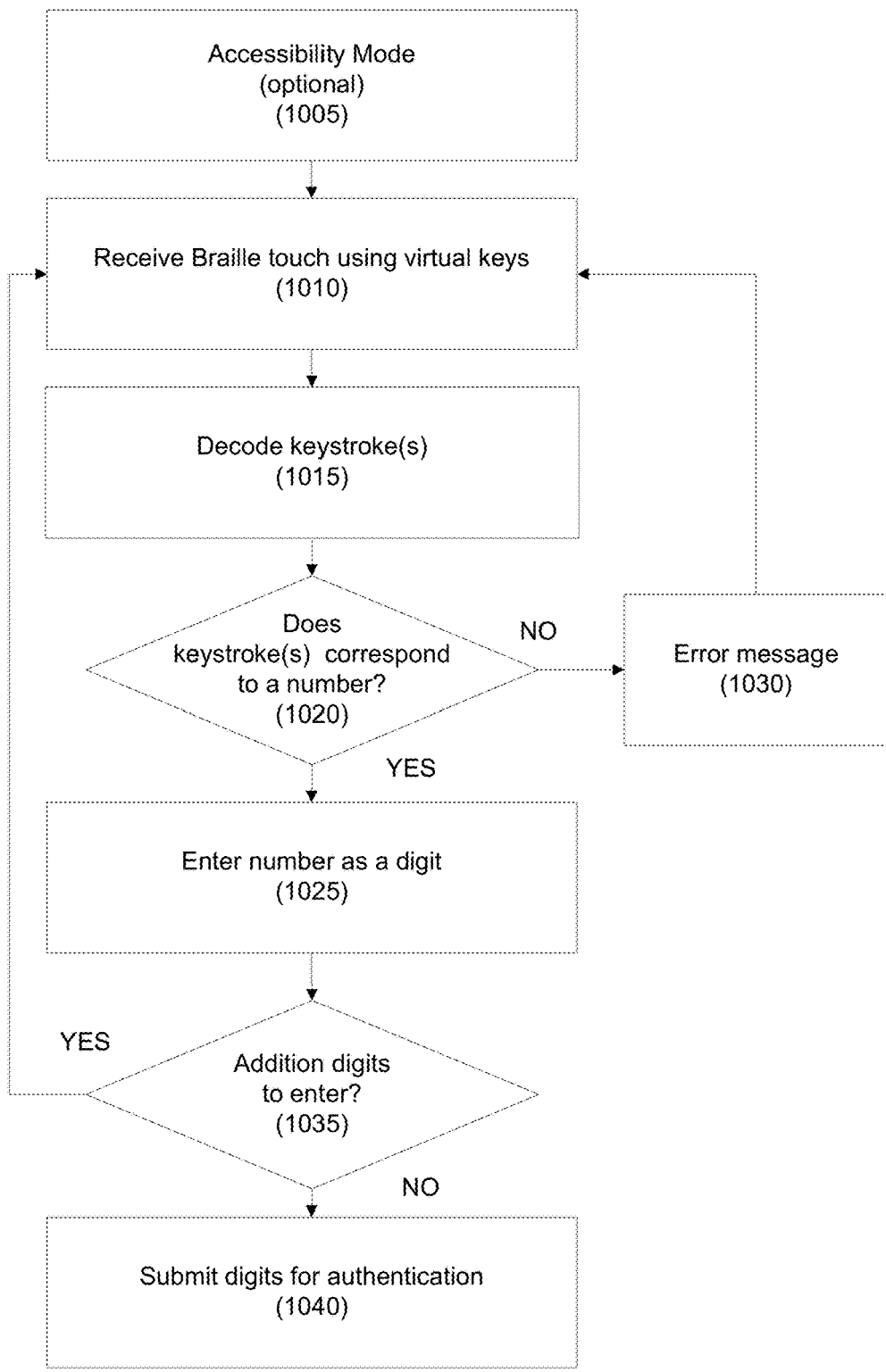
FIG. 10 depicts a method for entering data into a touch-sensitive screen enabled data entry device according to another embodiment.

Referring to FIG. 10, a method of authentication code entry using a touch-sensitive screen device is disclosed according to one embodiment.

In one embodiment, four virtual keys may be used. In another embodiment, six virtual keys may be used. In another embodiment, any suitable number of virtual keys may be used. Letters, numbers, shapes, and/or symbols may be entered using the embodiments disclosed herein.

In one embodiment, in optional step 1005, the data entry device may enter the accessibility mode. This may be similar to step 405, discussed above.

In step 1010, virtual keys may be presented on the screen. In one embodiment, the boundaries of the virtual keys may be delineated using, for example, haptic feedback, audio feedback, or in any other suitable manner.

In one embodiment, the virtual keys may be static or fixed. The position, size, and/or orientation of the virtual keys may be set by the user as part of a registration process.

In another embodiment, the virtual keys may "float." For example, the location of the virtual keys may be based on the locations at which the user touches the screen. In one embodiment, the virtual keys may move as the user's fingers move on the screen. If the virtual keys are within a predetermined distance of each other, a warning message, feedback, etc. may be provided to instruct the user to move his or her fingers further apart.

Figure 11A:
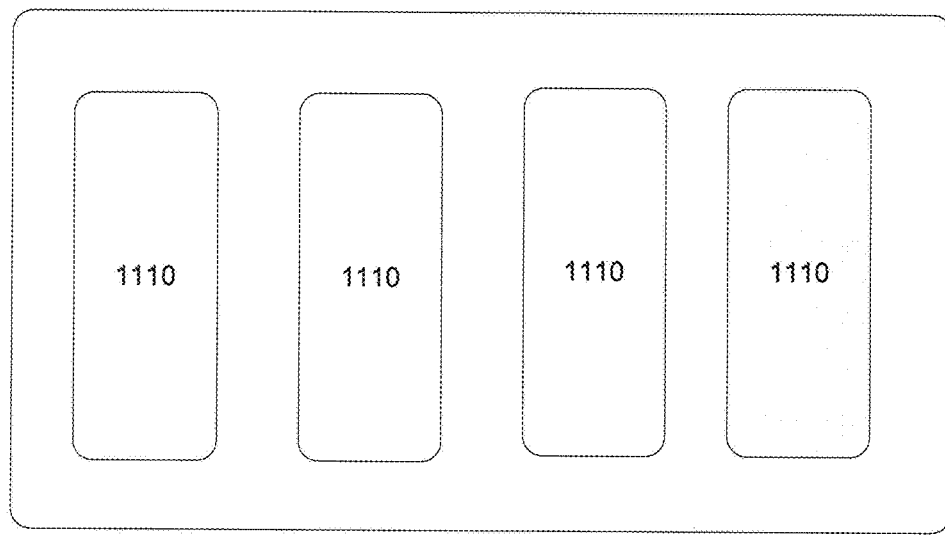
FIGS. 11A and 11B depict exemplary virtual key interfaces according to embodiments.
Figure 11B:
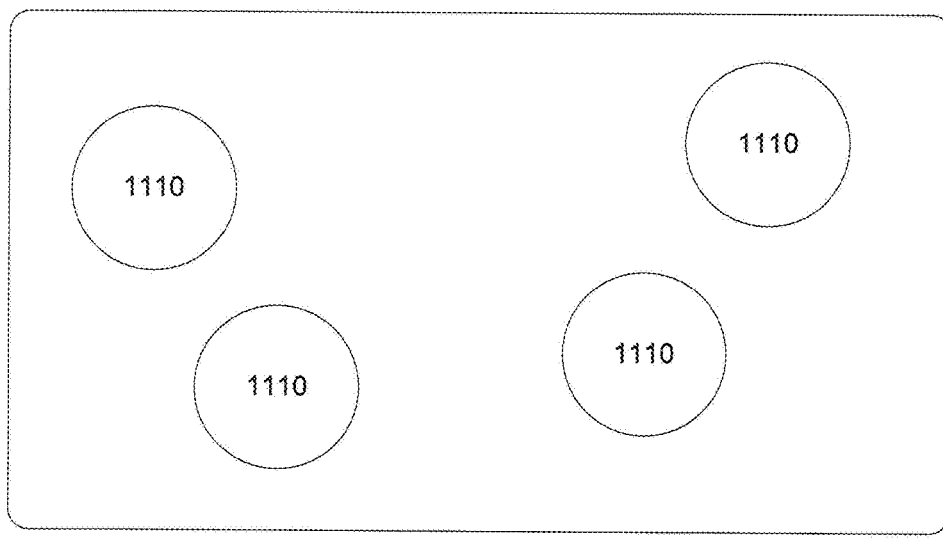

Examples of virtual keys are disclosed in FIGS. 11A and 11B. In FIGS. 11A and 11B, four keys 1110 are provided; additional or fewer keys 1110 may be provided as necessary and/or desired. In addition, the size, shape, and/or orientation of keys 1110 may vary as is necessary and/or desired. As noted above, the position of keys 1110 may "float" depending on points at which the touchscreen-sensitive device is touched.

In one embodiment, the virtual keys may not be displayed on the touch-sensitive screen.

Each key 1110 may be associated with a key on a Braille typewriter. For example, from left to right, keys 1110 may correspond to keys 2, 1, 4, and 5 on a Braille typewriter.

The user may select one or more virtual keys based on a pattern, such as that used by a Braille typewriter. An example pattern is shown in FIG. 12. Other patterns, including user-defined patterns, may be used as is necessary and/or desired.

In step 1015, the virtual keystroke(s) may be decoded based on the pattern.

In step 1020, if the virtual keystroke(s) correspond to a registered pattern number, in step 1025, the corresponding number may be recorded. In one embodiment, the data entry device may emit a sound or other indicator indicating the successful entry of a digit, and may display an indicator that a number was received (e.g., display an asterisk).

If the virtual keystroke(s) does not correspond to a registered pattern number, in step 1030, an error message, for example a sound or other dialog, may be played, and the process may be repeated.

If, in step 1035, if there are additional digits to enter, the process is repeated until all digits are entered. If all digits are received, in step 1040, the authentication code may be submitted to an authentication authority (e.g., an issuer) for approval. In one embodiment, the authentication code may be encrypted before being transmitted.

In one embodiment, transaction data may also be provided to the authenticating authority, either encrypted or unencrypted.

In one embodiment, the data entry device may verify the authentication code against data stored on the transaction card (e.g., on the chip), in the cloud, etc.

As discussed above, if the authentication code is incorrect, the process may be repeated, and if unsuccessful, the user may receive training.

Figure 13:
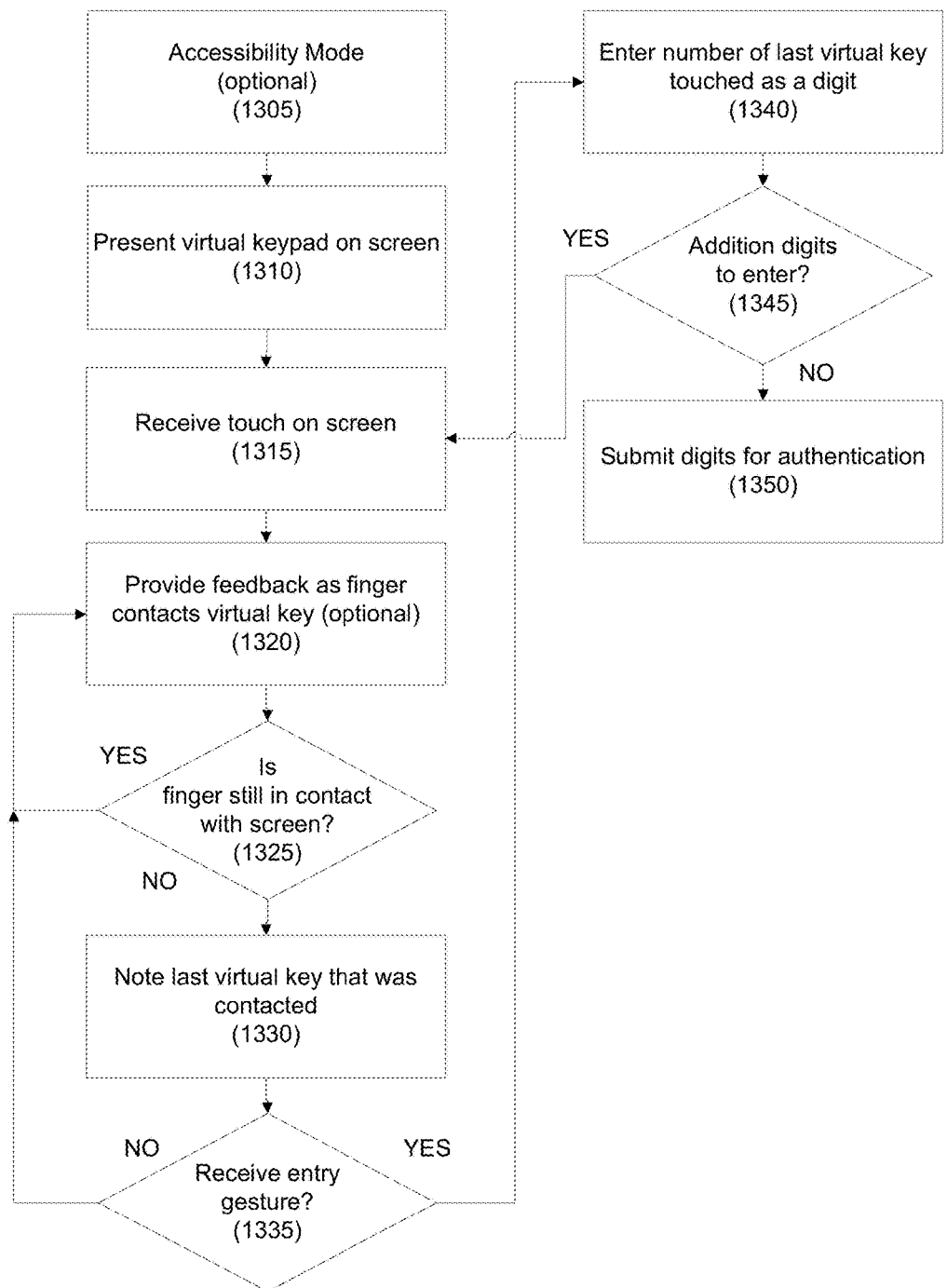
FIG. 13 depicts a method for entering data into a touch-sensitive screen enabled data entry device according to another embodiment.

Referring to FIG. 13, a method of authentication code entry using a touch-sensitive screen device is disclosed according to one embodiment.

In one embodiment, in optional step 1305, the data entry device may enter the accessibility mode. This may be similar to step 405, discussed above.

In step 1310, a virtual keypad may be displayed on the screen. Examples of suitable virtual keypads are disclosed in FIGS. 14A and 14B. In one embodiment, each virtual keypad may comprise a plurality of virtual keys. Each virtual key may define an area on the touch-sensitive screen that may be associated with a number, character, command, or symbol.

In one embodiment, the virtual keys may not be displayed on the touch-sensitive screen.

In step 1315, the user may touch the screen at any location. In optional step 1320, feedback may be provided as the user contacts each virtual key. For example, a sound may be played (e.g., a ding, beep, etc.) as the user touches each virtual key; haptic feedback may be provided, etc.

Figures 14A, 14B:
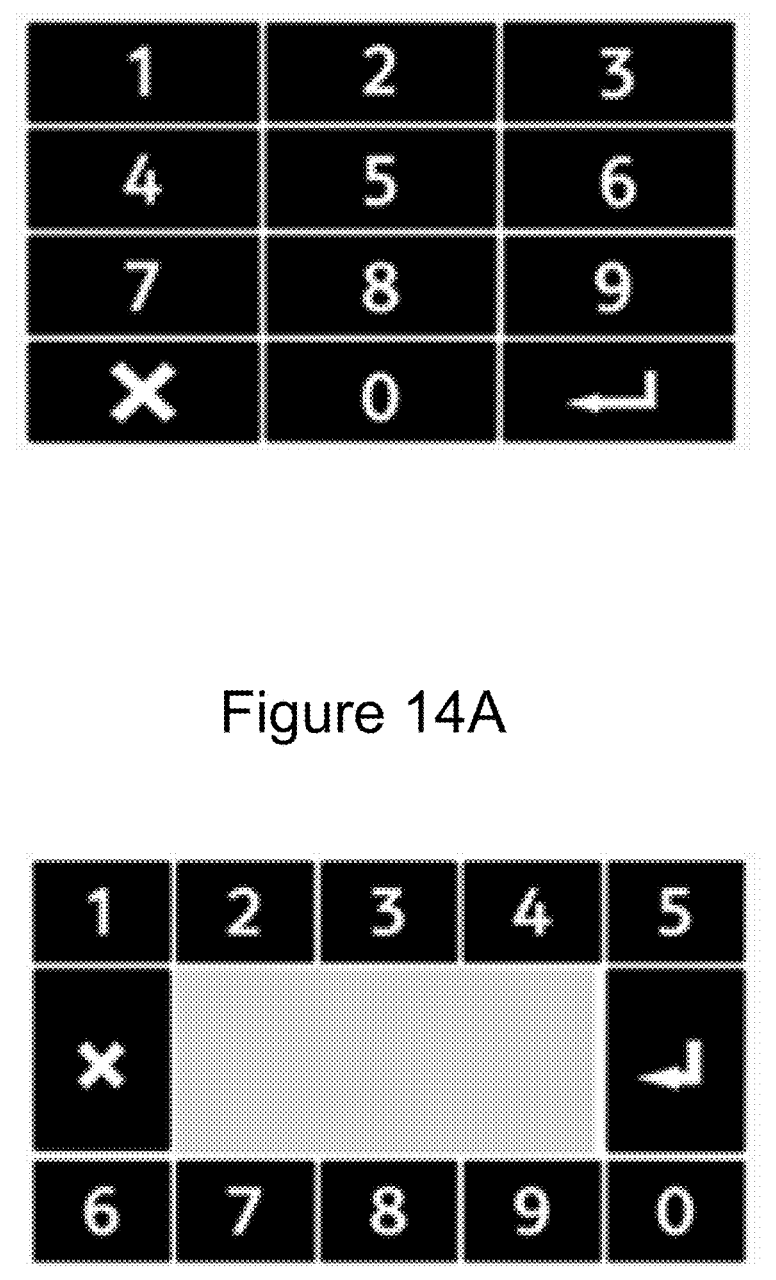

For example, in one embodiment, as user may start by touching the screen with a finger at the upper left corner of the screen (e.g., touching the "1" virtual key in FIG. 14A). The user may then start moving his or her finger to the right. As each virtual key is contacted (e.g., 1, 2, 3), feedback may be provided. By detecting this feedback, the user may determine the position of his or her finger on the keypad and the virtual key that the user is contacting.

In one embodiment, the feedback may be tactile (e.g., haptic feedback), audio feedback (e.g., a beep, chime, etc.).

In step 1325, once the user releases contact with the screen, in step 1330, the data entry device may note the last virtual key that the user was in contact with at the time of the release.

In step 1335, if an entry gesture is received (e.g., two quick taps, a selection of the "enter" virtual key, a gesture such as a checkmark drawn on the screen, etc.), in step 1340, the number of the last virtual key touched prior to the entry gesture is entered as a digit in the authentication code. If an entry gesture is not received, the last process is repeated until an entry gesture is received.

In one embodiment, the location at which the entry gesture is received may be different from the location of the virtual key that is being entered. In other words, regardless of where the entry gesture is provided on the screen, the number that is entered is the number associated with the last virtual key touched before the entry gesture is received.

In one embodiment, the entry gesture may be performed on the desired key. For example, the use may touch the virtual key with the entry gesture in order for the digit to be entered.

If, in step 1345, there are additional digits to enter, the process is repeated until all digits are entered. If all digits are received, in step 1350, the authentication code may be submitted to an authentication authority (e.g., an issuer) for approval, either encrypted or unencrypted.

In one embodiment, transaction data may also be provided to the authenticating authority, either encrypted or unencrypted.

In one embodiment, the data entry device may verify the authentication code against data stored on the transaction card (e.g., on the chip), in the cloud, etc.

As discussed above, if the authentication code is incorrect, the process may be repeated, and if unsuccessful, the user may receive training.

In one embodiment, certain gestures may be used to represent certain functions. For example, a swipe of the screen with the palm of a hand or a large "X" may be recognized as a "cancel operation and restart." A question mark may be recognized as the equivalent of pressing a "help" key. A check mark may be recognized as the equivalent of pressing an "enter" key. Additionally gestures, including user-defined gestures, may be used as is necessary and/or desired.

In one embodiment, in addition to a standard database of alphanumeric characters, Braille characters, etc. for recognizing characters entered by a user, a database of alternative characters that approximate standard characters as they may be entered by a person with impaired motor skills. For example, if the user is recognized as a person with impaired motor skills, the system may first compares the entry with the standard database and, in the event a match is not found, may then compare the entry with the characters entered in the special database. For example, while a non-impaired user may write a "1" as a single vertical stroke, an impaired user may write a "1" as a series of non-connected vertical strokes or dots.

Machine learning may be used to assist in future recognition of a user's specific handwriting style. For example, in one embodiment, a cloud based authentication process may include an entered signature and the unique characteristics thereof being sent to a remote server or cloud server. In training mode, a learning algorithm may register the entered signature and/or the unique characteristics thereof, and may store the signature and/or the characteristics in a database. It may further request additional authentication information from the user to proceed with the transaction.

In an authentication mode, the server may compares the entered signature and/or the entered signature characteristics stored signature and/or stored characteristics. It may assign an authentication score based on the comparison, and may provide a prompt to the system associated with the touch screen based on the score. If the score is above a predetermined threshold, the transaction is approved. If not, the transaction may be rejected or conditionally rejected and additional authentication may be requested from the user.

In one embodiment, the data entry device, and/or a server associated therewith, may include, in an authentication mode, a scoring subsystem that may provide an authentication score, based on a comparison of the currently input signature and the characteristics thereof with the signature and characteristics thereof which were recorded and stored during the training and/or learning mode operation. The transaction may be (1) accepted as having been authenticated when the authentication score exceeds a predetermined acceptance threshold; (2) conditionally rejected pending additional authentication, which may then be requested from the user when the authentication score does not exceed the first predetermined threshold but does exceed a second predetermined threshold, lower than the first predetermined threshold; or (3) rejected when the authentication score fails to exceed the second predetermined threshold.

In one embodiment, the data entry device may be operative to disregard accidental screen touches. For example, when a user is positioning one or more fingers on the screen, the accidental touch functionality may be operative to compare the size of the area being touched to differentiate between a finger touch and a palm touch. The data entry device may further capture finger touches when the fingers are removed from the screen, rather when they first touch the screen. This may reduce the occurrence of incorrectly located screen touches, since the user may reposition the finger prior to removal.

It will be appreciated by persons skilled in the art that the present invention is not limited by what has been particularly shown and described hereinabove. Rather the scope of the present invention includes both combinations and sub-combinations of features described hereinabove and variations and modifications thereof which are not in the prior art. It should further be recognized that these embodiments are not exclusive to each other.

It will be readily understood by those persons skilled in the art that the embodiments disclosed here are susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for entering data to a data entry device comprising at least one computer processor and a touch-sensitive screen, comprising:
   the touch-sensitive screen sensing a first input comprising at least one finger touch;
   the touch-sensitive screen sensing a release of the first input;
   the at least one computer processor determining a first number of finger touches in the first input;
   the at least one computer processor using the first number of finger touches to identify a first portion of an authentication code;
   the touch-sensitive screen sensing, within a predetermined period of time from the release of the first input, a second input comprising at least one finger touch;
   the touch-sensitive screen sensing a release of the second input;
   the at least one computer processor determining a second number of finger touches in the second input;
   the at least one computer processor using the second number of finger touches to identify a second portion of the authentication code; and
   the at least one computer processor calculating a sum of at least the first number of finger touches and the second number of finger touches, wherein the sum represents a value in the authentication code.

2. The method of claim 1, wherein a manner of receiving the first number of finger touches and the second number of finger touches is part of the authentication code.

3. The method of claim 1, wherein the data entry device comprises a point of sale device.

4. The method of claim 1, further comprising:
   the at least one computer processor causing feedback to be provided in response to the sensing of an entry gesture.

5. The method of claim 1, further comprising:
   the touch-sensitive screen sensing an entry gesture;
   wherein the sensing of the entry gesture causes the at least one computer processor to calculate the sum of the at least the first number of finger touches and the second number of finger touches.

6. A data entry device comprising:
   a touch-sensitive screen;
   a memory; and
   at least one computer processor;
   wherein:
      the touch-sensitive screen senses a first input comprising at least one finger touch;
      the touch-sensitive screen senses a release of the first input;
      the at least one computer processor determines a first number of finger touches in the first input;
      the at least one computer processor uses the first number of finger touches to identify a first portion of an authentication code;
      the touch-sensitive screen senses, within a predetermined period of time from the release of the first input, a second input comprising at least one finger touch;
      the touch-sensitive screen senses a release of the second input;
      the at least one computer processor determines a second number of finger touches in the second input;
      the at least one computer processor uses the second number of finger touches to identify a second portion of the authentication code;
      the at least one computer processor calculates a sum of at least the first number of finger touches and the second number of finger touches, wherein the sum represents a value in the authentication code.

7. The data entry device of claim 6, wherein a manner of receiving the first number of finger touches and the second number of finger touches is part of the authentication code.

8. The data entry device of claim 6, wherein the data entry device comprises a point of sale device.

9. The data entry device of claim 6, wherein at least one of the at least one computer processor comprises a touch-sensitive screen controller.

10. The system of claim 6, wherein the at least one computer processor causes feedback to be provided in response to the sensing of an entry gesture.

11. A method for entering data to a data entry device comprising at least one computer processor and a touch-sensitive screen, comprising:
   the touch-sensitive screen sensing a first input comprising at least one finger touch;

the touch-sensitive screen sensing a release of the first input;

the at least one computer processor determining a first number of finger touches in the first input;

the at least one computer processor using the first number of finger touches to identify a first portion of an authentication code;

the touch-sensitive screen sensing a second input comprising at least one finger touch;

the touch-sensitive screen sensing a release of the second input;

the at least one computer processor determining a second number of finger touches in the second input;

the at least one computer processor using the second number of finger touches to identify a second portion of the authentication code;

the touch-sensitive screen sensing an entry gesture; and in response to the sensing of the entry gesture, the at least one computer processor calculating a sum of at least the first number of finger touches and the second number of finger touches, wherein the sum represents a value in the authentication code.

12. The method of claim 11, wherein a manner of receiving the first number of finger touches and the second number of finger touches is part of the authentication code.

13. The method of claim 11, wherein the data entry device comprises a point of sale device.

14. The method of claim 11, further comprising:

the at least one computer processor causing feedback to be provided in response to the sensing of the entry gesture.

\* \* \* \* \*